April 9, 1957 W. GROGG, JR 2,788,487
TEST CELL FOR CONTINUOUSLY DETERMINING MOISTURE
CONTENT IN COMMINUTED MATERIALS
Filed Jan. 13, 1954 2 Sheets-Sheet 1

April 9, 1957 W. GROGG, JR 2,788,487
TEST CELL FOR CONTINUOUSLY DETERMINING MOISTURE
CONTENT IN COMMINUTED MATERIALS
Filed Jan. 13, 1954 2 Sheets-Sheet 2

INVENTOR.
WILLIAM GROGG, JR.
BY
ATTORNEYS

United States Patent Office 2,788,487
Patented Apr. 9, 1957

2,788,487

TEST CELL FOR CONTINUOUSLY DETERMINING MOISTURE CONTENT IN COMMINUTED MATERIALS

William Grogg, Jr., Kent, Ohio, assignor to The Quaker Oats Company, Chicago, Ill., a corporation of New Jersey Application January 13, 1954, Serial No. 403,884

8 Claims. (Cl. 324—61)

This invention relates to apparatus for determining the moisture content of finely divided materials by measuring the variance in capacitive effect of the material moving continuously between two electrodes across which a high frequency current passes, so that the material is the dielectric of a condenser in the high frequency circuit. More particularly, the invention relates to a novel and improved test cell comprising the condenser electrodes and mechanism for feeding the material between them.

United States Patent No. 2,665,409, issued January 5, 1954, to Charles E. Rogers, discloses an apparatus for determining the moisture content of organic material, wherein some of the material flowing through the main delivery chute is continuously diverted into a hopper from the lower end of which it discharges by gravity through a rectangular testing throat having in opposite sides electrode plates connected in a high frequency circuit, and from the bottom of the throat the material is returned to the main chute. In the test cell of the present invention the material is positively fed at constant speed between electrode plates of novel design.

Many organic materials, such as grains or grain products, give rise to considerable difficulty when tested for moisture content while flowing by gravity through a testing throat. Some such materials are sticky, preventing uniform flow; others cause bridging in the hopper because of being finely milled; and still others give inaccurate readings because of voids between the particles.

It is an object of the present invention to provide an improved test cell which feeds a constant volume of granular or comminuted material through an electronic testing throat.

Another object is to provide an improved test cell for use in electronically continuously testing a moving column of organic material for moisture content.

Further objects include the provision of a simply and inexpensively constructed test cell which is quickly assembled and dis-assembled, and which can be used to test a variety of materials.

These and other objects are accomplished by the novel and improved test cell comprising the present invention, a preferred embodiment of which is shown and described herein by way of example. Various modifications and changes in details of construction are comprehended within the scope of the appended claims.

Referring to the drawings.

The improved test cell is adapted for use with electrical capacitance measuring apparatus such as is shown in Patent No. 2,665,409, or with various other modifications of electrical capacitance measuring devices which may utilize radio frequency oscillator and amplifier circuits in a manner known in the art. As in said patent, the test cell includes electrodes connected in a radio frequency circuit and the material to be tested passes between the electrodes forming a tuning condenser for the circuit.

Figure 1:
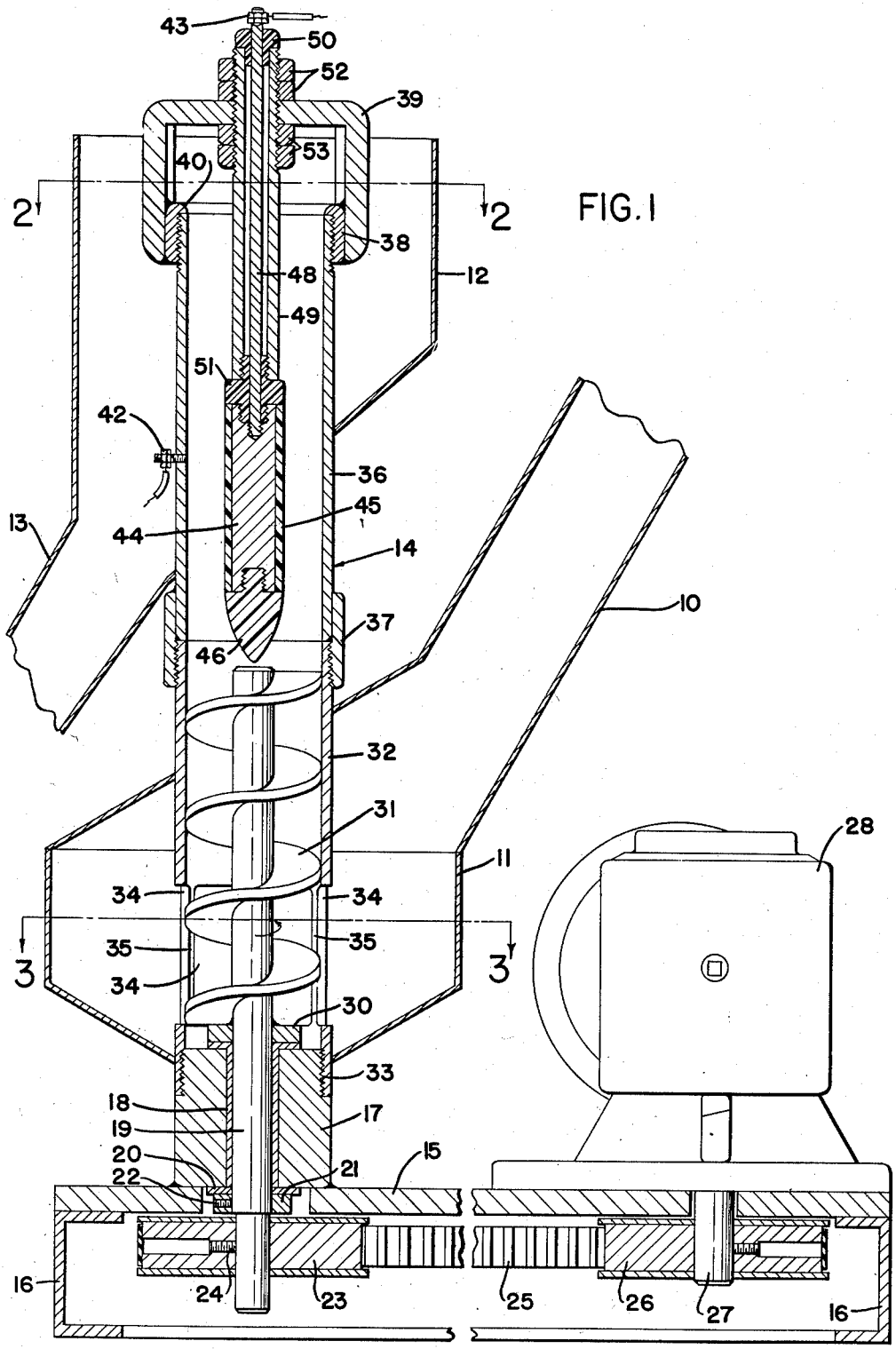
Fig. 1 is a vertical sectional view of the improved test cell of the present invention.
Figure 2:
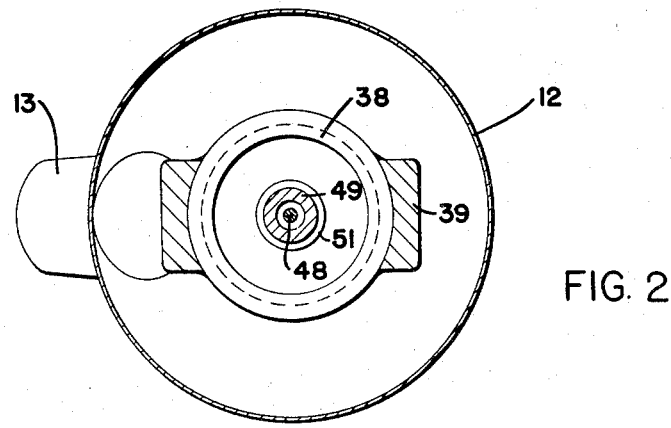
Fig. 2 is a transverse sectional view on line 2—2, Fig. 1.
Figure 3:
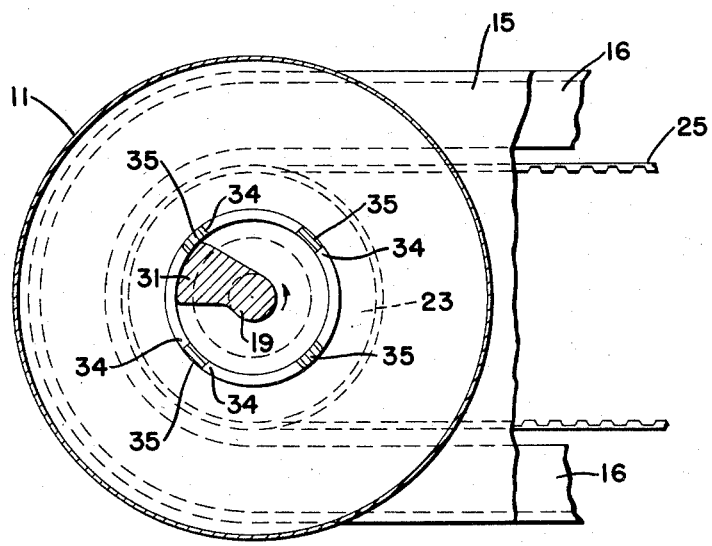
Fig. 3 is a transverse sectional view on line 3—3, Fig. 1.

Referring to Fig. 1, the lower end of a branch conduit is indicated at 10, the upper end (not shown) of this conduit being connected to the main chute through which the material being tested flows on its way from the milling room to other parts of the plant. The conduit 10 is adapted in a well known manner to divert a true cross section of the material from the main stream to the test cell. The bottom of conduit 10 feeds by gravity into a hopper 11 which completely surrounds the lower end of the test cell in which the material is fed upwardly and discharged from the top end into the hopper 12 of a conduit 13 which returns the material to the main stream at a point (not shown) below the cell.

The improved test cell preferably comprises a vertical tube indicated generally at 14 supported on a base plate 15 resting on channel members 16. The bottom of the tube preferably consists of a metal block 17 secured as by welding to the base plate 15 and having a bushing 18 of bronze or other bearing material therein in which the lower end of the shaft 19 of a vertical feed screw or auger is journaled. As shown, the lower end of the bushing 18 bottoms on an annular bearing disk 20 held in place by a collar 21 which is secured to the shaft by a set screw 22. Below the collar 21, the shaft is reduced in diameter and has a pulley 23 secured thereon by a set screw 24. The pulley 23 is driven in the direction of the arrow by a timing belt 25 from a similar pulley 26 secured on the shaft 27 of a vertical gear head motor 28 supported on the base plate 15.

An annular thrust plate 30 rests on the upper end of the bearing bushing 18 and plate 30 is secured by welding to the shaft 19. Above the plate 30 the shaft is provided with a helical flight 31 which continues to the upper end of the shaft. A cylindrical tube or casing 32 surrounds the flight with a close tolerance, and the lower end of the casing 32 may be screwed onto the block 17 as indicated at 33. Immediately above the plate 30, the casing 32 is provided with circumferentially spaced openings 34 forming vertical rigs 35 in the casing wall. Thus the comminuted material which accumulates in the hopper 11 passes by gravity through the openings 34 into the tube 32, and is fed upwardly by the flight 31 of the screw.

The upper end of casing 32 terminates a slight distance above the end of the screw and abuts the lower end of a tubular casing 36 of equal diameter which extends upwardly in continuation of the casing 32. Preferably, the casings are connected by a coupling sleeve 37 which is welded to the lower end of casing 36 and screws onto the upper end of casing 32. The upper end of casing 36 is open and has a mounting sleeve 38 screwed thereon to which a yoke 39 is secured as by welding. The rim of the sleeve 38 is preferably rounded as indicated at 40 for allowing unobstructed discharge between the legs of the yoke of the material fed upwardly by the screw through casing 36. The material discharged from the top of casing 36 falls into the hopper 12 and is conducted back to the main steam by conduit 13.

The cylindrical casing 36 constitutes one electrode of the cell and is preferably connected by a terminal 42 to ground in a suitable radio-frequency circuit, such as shown in Patent No. 2,665,409, for measuring variations in the electrical capacitance of the material due to variations in moisture content. The other electrode connected in the circuit by a terminal 43 is a core element 44 supported by the yoke 39 and extending axially through the casing 36. The core element 44 may be of brass and is encased in a sleeve 45 of plastic material having good dielectric strength and a smooth low friction surface to prevent contact between the electrode 44 and the material passing through the tube 36. This removes all possibility of short circuits which might otherwise be caused by contact between the electrode and material of high moisture content.

The electrode 44 preferably has a bullet shaped nose 46 of the same plastic material as the sleeve 45 screwed on its lower end for directing the flow of material from the screw around the electrode. The outer diameter of the core is substantially equal to that of the shaft 19 which is the core of the auger, so that the annular cross section between the inner electrode and the outer casing electrode 36 will conduct material to the full capacity of the screw 31, and an even linear rate of flow of material through the cell is maintained. The capacity of the screw is less than that of the conduit 10 so that the hopper 11 is maintained substantially full at all times.

The electrode 44 is supported on the axis of casing 36 by means of a steel tube 49 connected to the electrode 44 by insulating bushing 51 and adjustably mounted in yoke 39 by adjusting nuts 52 and 53 above and below the yoke 39. The electrode 44 is electrically connected to terminal 43 by a conductor rod 48 supported within the steel tube 49 by insulating bushings 50 and 51 and screwed into electrode 44. It will be seen that the entire cell assembly may be quickly dis-assembled by unscrewing the yoke 39 and the upper and lower tubes 36 and 32.

In the operation of the novel cell, with the electrodes connected in circuit with a suitable electrical capacitance measuring device, the screw is driven to feed the material from hopper 11 upwardly through the cell at a uniform rate which is fast enough to minimize frictional drag and yet slow enough to prevent generation of heat. The two electrodes and the material passing between them act as a condenser in a radio-frequency circuit connected to the capacitance measuring device, whereby variations in the moisture content of the material are measured in terms of variations in its capacitance. When measuring the moisture content of animal feed meal, for example, an optimum linear flow of about 100 feet per minute has been found satisfactory, but the speed may be varied substantially for different materials, both organic and inorganic.

Thus the novel cell provides a positive feed at constant rate through the condenser for a wide variety of materials, including coarse and fine materials as well as sticky ones. Both electrodes of the cell are annular and entirely surround the material moving through the cell so that an accurate reading of the capacitance of the material is obtained at all times. The test cell is inexpensive to construct, and is quickly and easily assembled and disassembled.

What is claimed is:

1. A test cell for use in a capacitance system for determining the moisture content of a material passing through the cell, including a vertically disposed tubular casing open at its upper end and a feed screw in the lower end of said casing for feeding material to the upper end, said casing having an opening for admitting material to the lower end of the screw, an electrode core, insulating means supporting said core axially of said casing above said screw, and means for electrically connecting the casing and the electrode core as the two electrodes of a condenser in said system.

2. A test cell for use in a capacitance system for determining the moisture content of a material passing through the cell, including a vertically disposed tubular casing open at its upper end and a feed screw in the lower end of said casing for feeding material to the upper end, said casing having an opening for admitting material to the lower end of the screw, an electrode core, insulating means supporting said core axially of said casing above said screw, the diameter of the electrode core being substantially equal to the core of the screw so as to maintain a constant linear flow of material through said tube, and means for electrically connecting the casing and the electrode core as the two electrodes of a condenser in said system.

3. A test cell for use in the capacitive measurement of the moisture content of a fluent material comprising, in combination, an upright tube constituting one electrode of a condenser, an insulated core element extending axially into the upper end of said tube and constituting the other electrode of said condenser, a feed screw within said tube beneath said core element, means for gravity feed of material to be tested to the lower end of said screw, and means for driving said screw so as to feed material upwardly past said core element.

4. A test cell for use in the capacitive measurement of the moisture content of a fluent material comprising, in combination, an upright tube constituting one electrode of a condenser, an insulated core element extending axially into the upper end of said tube and constituting the other electrode of said condenser, a feed screw within and axially of said tube beneath said core element, the diameter of said core element being substantially equal to the core of the screw, means for gravity feeding material to be tested to the lower end of said screw, and means for driving said screw so as to feed material upwardly past said core element.

5. A test cell for use in the capacitive measurement of the moisture content of a fluent material comprising, in combination, an upright tube constituting one electrode of a condenser, said tube including a lower casing detachably joined to an upper casing by a coupling member, a core element insulatively mounted in a yoke detachably affixed to said upper casing, extending axially into said tube and constituting the other electrode of said condenser, a feed screw within and axially of said lower casing beneath said core element, means for gravity feeding material to be tested into said lower casing, and means for driving said screw so as to feed material upwardly past said core element.

6. A capacitive test cell for use in determining the moisture content of a fluent material comprising, in combination, an outer electrode consisting of an upright tubular member, a core electrode extending axially into said tubular member, means for gravity feeding material being tested to the lower end of said tubular member, a feed screw within said tubular member beneath said core electrode and having such capacity as to cause full free flow through said tubular member, and means for driving said screw so as to feed material upwardly past said core electrode.

7. A capacitive test cell for use in determining the moisture content of a fluent material comprising, in combination, an outer electrode consisting of an upright tubular member, an insulated core electrode extending axially into said tubular member and having an outer dielectric sleeve, a feed screw within and axially of said tubular member beneath said core electrode, means for gravity feeding material being tested to the lower end of said tubular member in excess of the capacity of said feed screw, and means for driving said screw so as to feed material upwardly past said core electrode.

8. A capacitive test cell for use in determining the moisture content of a fluent material comprising, in combination, an outer electrode consisting of an upright tubular member, an insulated core electrode extending axially into said tubular member and having a dielectric outer sleeve and bullet-shaped nose, means for gravity feeding material being tested to the lower end of said tubular member, a feed screw within and axially of said tubular member beneath said core electrode and having such capacity as to cause full free flow through said tubular member, and means for driving said screw so as to feed material upwardly past said core electrode.

References Cited in the file of this patent

UNITED STATES PATENTS

| | | |
|---|---|---|
| 2,016,920 | Fisher et al. | Oct. 8, 1935 |
| 2,485,579 | Elliott | Oct. 25, 1949 |
| 2,599,583 | Robinson et al. | June 10, 1952 |
| 2,665,409 | Rogers | Jan. 5, 1954 |